Nov. 12, 1935.  M. H. DUVAL  2,020,771
AUTOMATIC CARBURETOR CONTROL
Original Filed Feb. 25, 1932   2 Sheets-Sheet 1
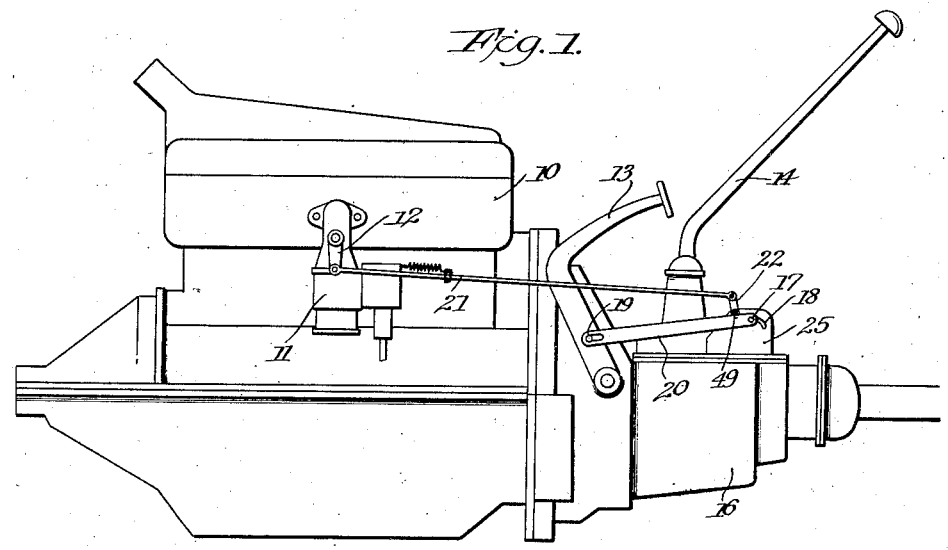
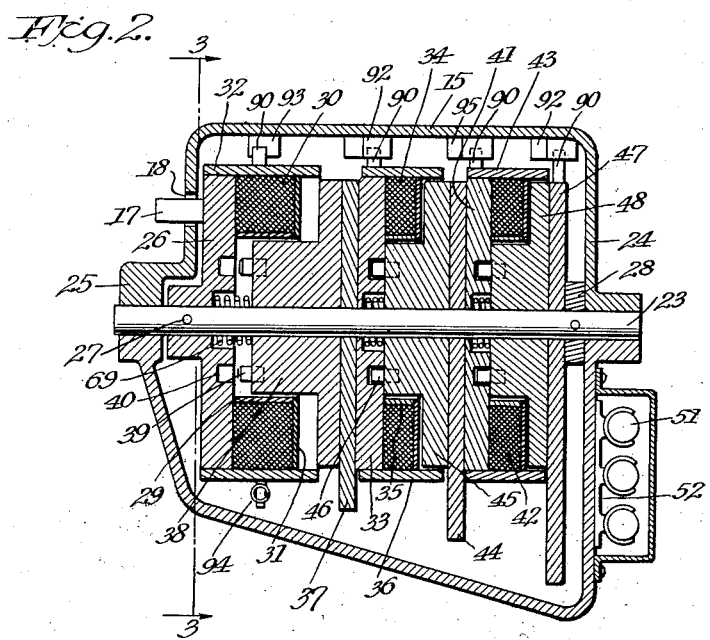
Inventor
Montague H. Duval,
By Cushman, Bryant, Darby & Cushman
Attorneys Nov. 12, 1935. M. H. DUVAL 2,020,771
AUTOMATIC CARBURETOR CONTROL
Original Filed Feb. 25, 1932  2 Sheets-Sheet 2
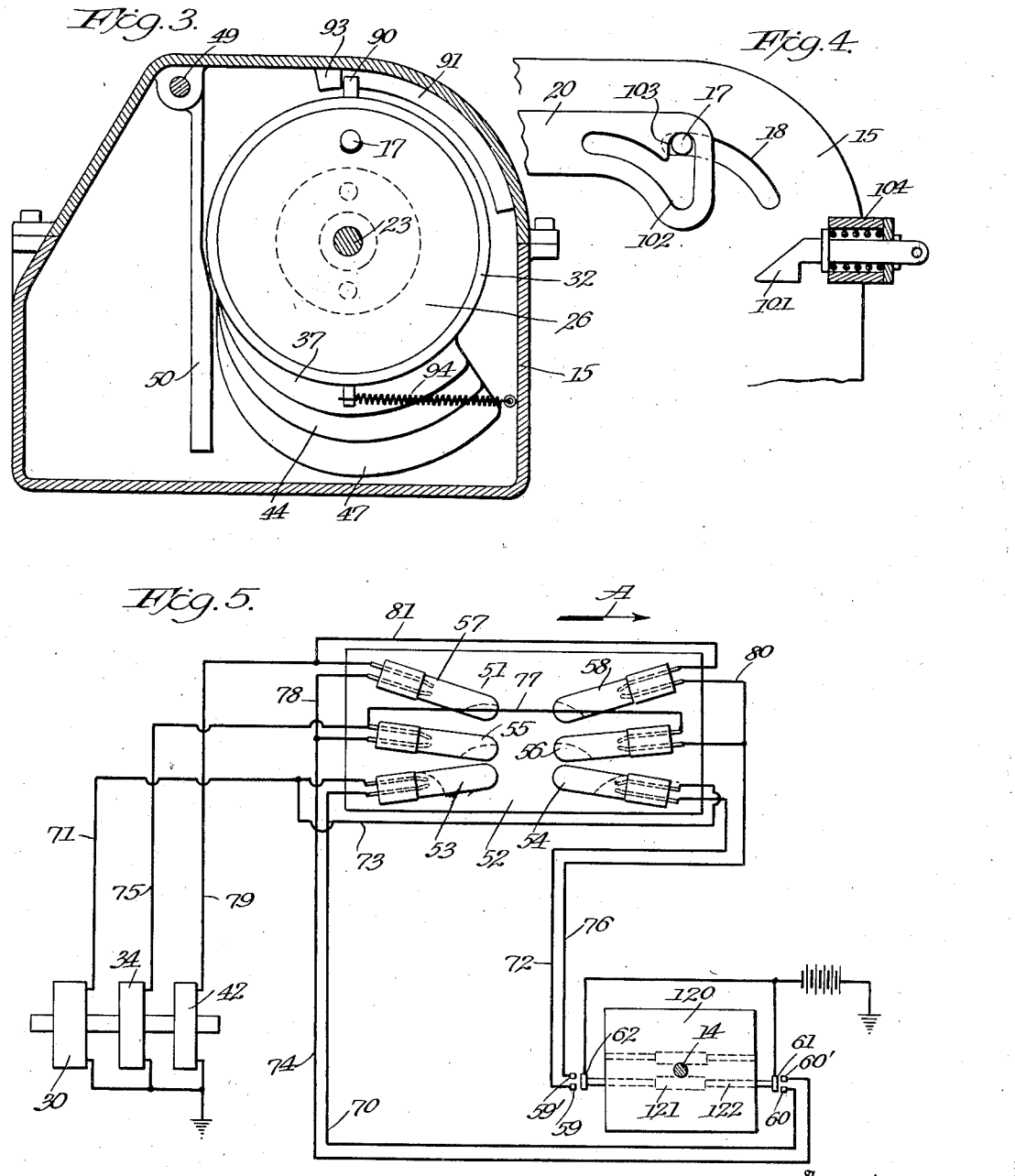
Inventor
Montague H. Duval, Patented Nov. 12, 1935

2,020,771

UNITED STATES PATENT OFFICE 2,020,771

AUTOMATIC CARBURETOR CONTROL

Montague H. Duval, Great Neck, N. Y.

Application February 25, 1932, Serial No. 595,204
Renewed April 8, 1935

22 Claims. (Cl. 192—0.01)

The invention relates to a carburetor control for motor vehicles.

Generally, the invention automatically provides the correct amount of fuel for the motor of a motor vehicle when the latter is moving in a forward or backward direction, depending upon the position of the motor vehicle relative to the horizontal.

With the usual controls universally provided in motor vehicles, it is exceedingly difficult for the average driver to judge the degree of throttle opening necessary to correctly and smoothly start the motor vehicle in forward or backward direction. Such operation, of course, requires simultaneous release of the clutch pedal with the left foot, and depression of the accelerator with the right foot, or operation of the hand throttle.

This results quite often in too much fuel supply and subsequent "bucking" of the motor vehicle, or too little fuel supply and subsequent "stalling" of the motor vehicle.

The described situation is accentuated where it is necessary to start on an upward grade. At such a time, with the motor vehicle stationary and about to be started, the driver must have both feet positioned on the clutch and brake pedals, respectively. When the start is made, the right foot must be quickly shifted from the brake pedal to depress the accelerator and simultaneously, the clutch pedal must be released. An alternative operation is to release both the clutch and brake pedals at the same time and operate the hand throttle.

The synchronization of these operations depends upon the human element, and does not, in any driver, approach mechanical perfection.

I have, therefore, in the experimentation and development of my invention, endeavored to eliminate the human element and to provide a purely automatic device to accomplish the desired results.

There have been, I am aware, inventions which broadly control the supply of carbureted fuel by gravity, but such devices have proven unsatisfactory and do not provide the absolute automatic qualifications which are necessary for the purposes and results of my invention.

In the drawings and description of my invention hereinafter set forth I have disclosed a form of the device adapted for use when initial movement of the motor vehicle is made in forward or backward direction. Such adaptation is for illustrative purposes only, as it is obvious and will be strictly understood that the device may be adapted for use after the said initial movement of the motor vehicle and shifting of the forward transmission gears, which, together with many and various modifications of the invention, are within the spirit and scope of the present application.

It is one of the objects of my invention to provide an automatic carburetor control which supplies fuel to the motor of a motor vehicle according to the position of the motor vehicle relative to the horizontal.

Another object of my invention as set forth in the present disclosure is to provide an automatic carburetor control which supplies fuel to the motor of a motor vehicle, the operation of which is confined to initially starting the motor vehicle in forward or backward direction.

A further object of my invention as set forth in the present disclosure is to provide an automatic carburetor control which supplies fuel to the motor of a motor vehicle and eliminates the necessity of using the accelerator or hand throttle controls when initial movement is made, requiring only release of the clutch pedal, which operation connects the motor and drive shaft, as usual, and simultaneously applies the correct amount of fuel to the motor.

Still a further object of my invention is to provide an automatic carburetor control which supplies fuel to the motor of a motor vehicle and which will in no way affect the universally adopted methods of operating a motor vehicle and need only be used when desired.

Another object of the invention is to provide a mechanism of the type described which may be used with any automobile, and which is so designed that it may automatically release itself from operative engagement upon completion of its function, if so desired.

Still another object is to provide a mechanism of the type described, in which certain of the operating elements are adapted to be actuated through electric circuits, which circuits are automatically controlled in accordance with the inclination of the motor vehicle.

Other objects and advantages of my invention will be hereinafter apparent.

In the drawings,

Figure 1 is a side elevation showing an automobile engine with my invention applied thereto;

Figure 2 is a central vertical section through the control casing used with the device;

Figure 3 is a vertical transverse section on the line 3—3 of Figure 2;

Figure 4 is a detail side elevation, showing a release mechanism which can be used with the device;

Figure 5 is a wiring diagram of the electric circuits employed in the device; and Figure 6 is a detail view of a portion of the inner wall of the control casing of the device.

The numeral 10 generally designates an automobile engine provided with the usual carburetor 11 having a throttle control arm 12. The numeral 13 indicates the clutch pedal of the engine and the gear shift lever is shown at 14. In each of the several views of the drawings, the clutch pedal is assumed to be in depressed or disengaged position.

The control mechanism of my invention is contained in a casing 15, which is preferably secured to the transmission casing 16 of the vehicle. A stud 17 projects from an arcuate slot 18 at one side of the casing and is connected to a pin 19 on the clutch pedal 13 by a link 20 as shown in Figure 1. The throttle arm 12 is operated from the control casing 15 of my device through a rod 21, the end of this rod adjacent the control casing 15 being connected to an actuating arm 22, which projects from the casing 15. In order to simplify the showing of the device, the usual manual and foot controls for the throttle arm have been omitted from the showing of the vehicle engine.

The control mechanism of my invention within the casing 15 comprises a shaft 23 preferably having its ends journaled in the side walls 24 and 25 of the casing 15 and held against lateral movement by a pinned collar 28, so that the shaft 23 extends at right angles to the longitudinal axis of the car. I find that it is desirable to have the shaft 23 formed of non-magnetic metal. A disc 26 preferably of soft iron is fixed to the shaft 23 by a pin 27. The left hand face of the disc 26 (as viewed in Figure 2) carries the stud 17 which projects from the casing 15 and is connected to the clutch pedal through the link 20. The right hand face of disc 26 has fixed thereto a brass sleeve 29 about which is mounted an electro-magnetic coil 30. A fiber disc washer 31 is secured to the right hand face of the coil 30 and a soft iron collar 32 secured to the periphery of the disc 26 surrounds the respective peripheries of the disc and the coil 30 and projects to the right somewhat past the side face of coil 30. A second soft iron disc 33 of the same diameter as disc 26 is slidably mounted on the shaft 23 and has secured thereto an electro-magnetic coil 34 somewhat smaller and less powerful than the coil 30. The coil 34 is provided with a brass sleeve 35 and a fiber disc generally similar to the corresponding parts which encase the coil 30. A soft iron sleeve 36 is secured to the periphery of disc 33 and extends past the inner face of the coil 34. A cam disc 37 of non-magnetic material is secured to the left hand face of disc 33 and a circular member 38 of soft iron forming an armature for the coil 30 is fixed to cam 37. The shape of the armature 38 is such that it may be moved into and against the coil 30, but as is shown in Figure 2, the armature 38 is normally spaced from the coil 30, since spring 69 is stronger than the corresponding springs between the other members. It will be seen that the arrangement of disc 26, collar 32 and armature 38 about the coil 30 provides the coil with a closed magnetic field. All other coils in the device are shown with similarly closed fields. Clutch pins 39 are secured to the face of the armature 38 opposite the disc 26 and are adapted to fit into recesses 40 in the face of disc 26.

A third soft iron disc 41 is mounted upon the shaft 23 between the disc 33 and the side wall 24 of the casing. This disc is provided with a coil 42 having a brass sleeve and fiber disc exactly similar to those with which the coil 34 is provided. A soft iron sleeve 43 also surrounds the coil 42. A cam disc 44 of somewhat different configuration than cam 37 and also of non-magnetic metal is secured to disc 41 and a circular soft-iron armature 45 is also fixed to cam 44. Armature 45 is provided with clutch pins 46 which fit into recesses in the face of the second disc 33. Armature 45 is normally clutched to disc 33, as shown in Figure 2 of the drawings. A third cam disc 47, also of non-magnetic metal, is slidably mounted on shaft 23 and carries an armature 48 of a construction similar to the second armature 45. Armature 48 is adapted to be normally clutched to disc 41 by a pin and recess mechanism similar to that described in connection with the other armatures, as shown.

An actuating shaft 49 is journaled in the walls of the casing 15 above and to one side of shaft 23 and to extend parallel therewith. The end of shaft 49 which is journaled in the end wall 25 of casing 15 extends through the casing and actuating arm 22 operatively connected to the throttle control 12 is fixed thereto. A plate 50 has its upper end fixed to shaft 49 and is positioned in the rotary path of movement of the cams 37, 44, and 47 as shown in Figure 3. It will be noted from Figure 3 that these three cams are of progressively varying configurations, the first cam 37 being the smaller. The cams 37, 44, and 47 are adapted to be selectively clutched together by electric circuits preferably controlled through a series of mercury switches generally indicated in Figure 2 by the numeral 51 and mounted on the casing 15, which mercury switches are mounted to close various circuits in accordance with the degree of inclination of the street or road on which the automobile is standing or moving. The manner of mounting the mercury switches and the arrangements of the circuits through which they control the electro-magnetic coils 30, 34 and 42 is diagrammatically shown in Figure 5, 120 representing the gear box of the automobile, 121 the gear selector arm for first and reverse speeds, 122 any suitable means of mounting electrical contacts 61 and 62 on the selector arm 121, so that these contacts make or break the circuit as the gear lever 14 is moved either in or out of engagement with first or reverse gears. Contacts 61 and 62 are connected with the battery of the car, and are insulated from the gear box and frame of the car generally.

In order to control the acceleration of the automobile in starting either in forward or reverse upon varying inclines, I preferably use six mercury tubes of any well known type, all mounted on a vertical panel 52 but at various angles thereon with respect to "level", as shown in Figure 5. The tubes 53, and 54 actuate the circuits for controlling starting of the vehicle when it is substantially level, tube 53 being for use when the vehicle is to be moved forward and 54 being the "reverse" controlling tube. A second pair of mercury switches 55 and 56 are mounted on panel 52 at such an angle that they will be closed when the automobile is on a moderate incline, and control forward and reverse movements, respectively at such an angle. Tubes 57 and 58 control forward and reverse movements, respectively, on relatively steep inclines.

and are mounted on the panel at the proper angle to accomplish this result. The various mercury switches are in circuit with the electro-magnetic coils 30, 34, and 42 which they are intended to control and further selection of the proper circuits to determine whether a circuit for forward or reverse movement of the car is to be closed is obtained through contacts 61 and 62 adapted to provide two circuits for each of first and reverse gears through contact 60, 60' and 59, 59' respectively.

The operation of the device is as follows:—

Assuming that the automobile is standing on a level street or road, the mercury within the "level" switches 53 and 54 will be in contact with the contact points of these two tubes. The mercury in the remaining four tubes will be out of contact with the contact points of those tubes. If the automobile is to be started, the clutch pedal 13 will be pressed inwardly to disengage the clutch as shown in Figure 1, and this movement of the clutch will, through the pin 19 and link 20, pull the stud 17 on disc 26 forwardly as viewed in Figure 1 and will rotate disc 26 in counter-clockwise direction as viewed in Figure 3, thereby aligning the recesses 40 of disc 26 with the pins 39 of armature 38. If the automobile is to be moved forwardly, the gear shift lever 14 will be moved to the usual "forward" position and by this movement, will move the contact 61 to provide circuits through 60 and 60'. A closed circuit through contact 60, lead 70, mercury tube 53, and lead 71, and coil 30 to ground will result and electro-magnetic coil 30 will draw the armature 38, cam disc 37 and disc 33 to the left (Figure 2). It will be noted that disc 33 is provided with a pin 90 engaging a shoulder 92 on the inner wall of casing 15 and which is normally seated in a recess 95 in the shoulder to hold the disc against rotation. Movement of disc 33 to the left (Figure 2) with armature 38 will disengage pin 90 from recess 95 and the disc 33 will be free to rotate. Since the pins 39 of the armature are seated in the recesses 40 of the disc 26, these two parts will be locked together. Also, this movement of armature 38 to the left will disengage the disc 33 from the pins 46 of the second armature 45 so that armature 38 will be free to rotate with disc 26. When the clutch pedal 13 is now released, its movement will, through link 20, rotate the disc 26, armature 38, and cam plate 37, in a clockwise direction. The movement of the cam surface 37 against the throttle control plate 50 will swing the plate to the left (Figure 3) and this movement being transmitted to the throttle arm 12 through the lever 22 and rod 21, will open the throttle the desired amount to give the motor the proper degree of acceleration to accomplish a smooth starting. While turning in the manner described above, the pin 90 on collar 36 of disc 33 will move along the left hand side (Figure 6) of shoulder 92, against the surface 97 of the shoulder. Since the pin 90, in this position, will be held against moving to the right (Figure 2) the armature to which the pin corresponds cannot possibly be disengaged from its electro-magnet during operation of the device. Similar pin and shoulder means are provided on the collar 43 of disc 41 and on disc 47. The cam disc 37 and throttle control plate 50 will remain turned to the position described until the clutch is again disengaged to move disc 26 and cam disc 37 counter-clockwise. This movement of disc 26 is assisted by spring 94 which tends to pull the pin 90 thereof against the stop 93. When the gear shift lever 14 is moved from low speed position, it will move contact 61 to break the circuit described above, and the de-energization of coil 30 will permit the spring 69 to return armature 38 to the right.

If the vehicle is to be reversed from a level position, the gear shift lever 14 will move the contact 62 to engage the contacts 59 and 59' and circuit through contact 59, lead 72, mercury tube 54, lead 73, lead 71, and electro-magnet 30 to ground will result. The remainder of the operation in this instance will be as described in the paragraph immediately preceding.

If the vehicle is on a moderate forwardly incline, that is, with the forward end of the vehicle higher than the rear end, or, considered with respect to Figure 5, with the vehicle facing upwardly in the direction of the arrow A, the mercury in tube 55 will bridge the contacts of that tube. When the car is to be started, the clutch pedal 13 will be actuated as before to move disc 26 in a counter-clockwise direction. When the gear shift lever 14 is now moved to forward "low" position, the contact 61 will close circuits through the "level" tube 53 and through the coil 30, and at the same time, will close a circuit through the tube 55 as follows:—through contact 60', lead 74, tube 55, lead 75, coil 34, to ground. The first of these two circuits, through tube 53 will cause coil 30 to move armature 38 to the left, and the second circuit, through tube 55, will cause coil 34 to retain armature 45 in engagement with disc 33 and draw it out of engagement with the clutch pins of the third armature 48. Release of the clutch pedal 13 will rotate cams 37 and 44 in clockwise direction and since cam 44 is larger than cam disc 37 and so shaped as to give a faster and greater movement to the throttle control plate 50, the car will be given more acceleration to meet the requirements of the slope upon which it is standing. The mechanism will be released in the manner described before.

Assuming that in this same position reverse gear is now engaged, the rear end of the car will be downwardly inclined, and less acceleration will be necessary to start the car in this direction. Mercury switch 54 is set so that it is still in contacting position on such a grade. Movement of gear shift lever 14 into reverse position will move contact 62 to engage contact 59, and a closed circuit through 59, lead 72, mercury tube 54, lead 73, lead 71 and coil 30 will result. Since mercury tube 53 is in contacting position, the current in lead 71 will pass into lead 70 to contact 60. Separation of 60 and 60' prevents the current from passing into lead 74, and thus coil 34 of disc 33 cannot become energized. Thus, when the clutch pedal moves toward engaged position, only armature 38 and cam 37 will be rotated with disc 26. Plate 50 (Figure 3) will only be moved the minimum amount in this instance, and a proportionately small amount of acceleration brought about for the start in a downwardly direction.

When the car is standing on a moderate slope with its rear end facing up the slope, movement of the gear shift lever 14 will cause contact 62 to provide circuits through tube 54 and coil 30 in the manner already described and since the mercury in tube 56 is now in contact with the contact points of that tube, a circuit will also be closed through contact 59', lead 76, tube 56, lead 77, lead 75, and coil 34 to ground. The car will thus be accelerated for reverse movement in the manner described in the second preceding paragraph. Engagement of first gear in this case will actuate the device in a similar manner to that described in the paragraph immediately preceding.

When the automobile is standing on a relatively steep grade with the forward end of the car facing up the incline, the mercury in tube 57 will be in contact with the contact points of that tube. The clutch mechanism will be actuated in the manner already described and the movement of the gear shift lever 14 to forward position will close the circuits through tubes 53 and 55 and their associated coils 30 and 34, respectively. Since the upper tube 57 is now in closed circuit position a circuit will result through lead 74, lead 78, tube 57, lead 79, and coil 42 to ground. These circuits will result in the movement of coils 34 and 42 to the left and since coil 42 is now energized it will also draw armature 48 and cam disc 47 to the left. Since this latter cam is larger than the cams 37 and 44, it will move the throttle control plate 50 the necessary distance to properly accelerate the car for such a slope.

On such a slope, mercury switch 54 will be at an angle sufficient to break the contact between its points, and mercury switches 56 and 58 will obviously be in non-contacting position. Thus, engagement of reverse gear will not provide any circuits for the coils of the device, and release of the clutch pedal will not cause any acceleration of the engine.

If the automobile is upon a relatively steep grade with the rear end facing up the slope, the mercury in the contact tube 58 will bridge the contact points of that tube. It will result from this that if the clutch has been operated and the gear shift lever 14 moved to reverse, the contact 62 will provide circuits through all three of the "reverse" tubes 54, 56, and 58, the circuit through the last tube being through contact 59', lead 76, lead 80, tube 58, lead 81, lead 79, and coil 42 to ground. The movement of the armatures in this instance will be the same as described in the second preceding paragraph and the car will be properly accelerated for the reverse movement. Engagement of first gear on this hill and subsequent release of the clutch pedal will cause no acceleration of the engine, in a similar manner to that described in the paragraph immediately preceding.

It will be understood that additional coil units and cam discs may be used with my device in order to accommodate the device to steeper grades or in order to increase the number of gradations for which the device may be set.

In order to make my device adaptable in such a way that it will automatically release itself when the clutch pedal of the car reaches fully engaged position, should this prove desirable, I provide the arrangement shown in detail in Figure 4. This shows the end of arm 20 which engages pin 17 of disc 26. It will be seen that slot 102 of this arm is so shaped that gravity will cause pin 17 to be engaged in the upward part 103 of the slot unless the arm 20 is so raised as to prevent this. As shown, the arm 20 is in its extreme forward position, that is, the clutch pedal is completely depressed. Release of the clutch pedal will cause arm 20 to move pin 17 through the arcuate slot 18 and thereby actuate the device. Trip member 101, slidably mounted in a bracket 104 attached to the housing 15, is connected to any suitable control means so that the driver can move it either into "engaged" or "disengaged" position at will.

Assuming trip member 101 to be in "engaged" position, in solid line in the drawings, it will prevent the downward movement of arm 20 just before same reaches the end of its stroke. On account of the cam surface of member 101, arm 20 will be raised upward so that when the clutch pedal is in fully engaged position, pin 17 will become disengaged from the upward part 103 of slot 102, and will return through arcuate slot 18 and the elongated part of slot 102, to its normal position, assisted by spring 94 (Figure 3). This will cause the carburetor of the car to return to idling position, such as would be desirable, for instance, when "free-wheeling" is in use. When the clutch pedal is again depressed, arm 20 will drop and engage pin 17 in slot 103 by gravity, thus actuating the device when the clutch pedal is released.

Movement of trip member 101 to "disengaged" position would allow pin 17 to remain in engagement with the upward slot 103 at all times. The movement of trip member 101 could, if desired, be operated in conjunction with the control of the "free wheeling" unit on a car fitting this type of transmission.

I claim:

1. In a motor vehicle including gear changing mechanism, a clutch operator and a carburetor control, means to actuate said carburetor control with the clutch control and in accordance with the angle of inclination of the vehicle and the actuation of the gear changing mechanism.

2. In a motor vehicle including gear changing mechanism, a clutch operator, a carburetor and a throttle control for the carburetor, means to actuate said throttle control with the clutch control, comprising an electrical actuating device adapted to be operated in accordance with the actuation of the gear changing mechanism.

3. In a motor vehicle including gear changing mechanism, a clutch operator, a carburetor and a throttle control for the carburetor, means to actuate said throttle control with the clutch control comprising electric control means, the circuit of which is adapted to be closed in accordance with the angle of inclination of a vehicle and the actuation of the gear changing mechanism.

4. In a motor vehicle including a gear changing mechanism, a transmission clutch control, a carburetor and a throttle control for said carburetor, a cam member to operate the throttle control, clutch means to operatively connect said member to the transmission clutch control, said clutch means being actuated in accordance with the angle of inclination of the vehicle and the operation of the gear changing mechanism.

5. In a motor vehicle including a gear changing mechanism, a transmission clutch control, a carburetor and a throttle control for said carburetor, a cam member to operate the throttle control, electric clutch means to operatively connect said member to the transmission clutch control, said clutch means being actuated in accordance with the angle of inclination of the vehicle and the operation of the gear changing mechanism.

6. In a motor vehicle including gear changing mechanism, a transmission clutch control and a carburetor, members adapted to be selectively connected to the transmission clutch control to control the carburetor, electric control means to connect said members to the transmission clutch control, said control means being selectively controlled through the gear changing mechanism.

7. The combination in a vehicle including a clutch mechanism and transmission gearing, of a control for the carburetor of the vehicle including means operatively connected to the carburetor and operated by the clutch to an initial position, said means being moved from its initial position and to control the carburetor by operation of an electric circuit controlled by actuation of the transmission gearing, and gravity actuated means to determine the degree of the latter movement.

8. In a motor vehicle including gear changing mechanism, a clutch operating mechanism, a carburetor and a control for the carburetor, means to operate the carburetor control, means to determine the degree of operation of said means controlled by the gear changing mechanism, said first named means being actuated by actuation of the clutch mechanism.

9. In a motor vehicle including gear changing mechanism, a clutch operator, a carburetor and a throttle control for the carburetor, means to actuate said throttle control with the clutch control comprising electric control means, the circuit of which is adapted to be closed in accordance with the actuation of the gear changing mechanism.

10. In a motor vehicle including gear changing mechanism, a transmission clutch control, a carburetor and a throttle control for said carburetor, a member to operate the throttle control, electrical clutch means to operatively connect said member to the transmission clutch control, said clutch means being actuated in accordance with the operation of the gear changing mechanism.

11. In a motor vehicle including a gear changing mechanism, a transmission clutch control, a carburetor and a throttle control for said carburetor, a cam member to operate the throttle control, clutch means to operatively connect said member to the transmission clutch control, said clutch means being actuated in accordance with the operation of the gear changing mechanism.

12. In a motor vehicle including a gear changing mechanism, a transmission clutch control, a carburetor and a throttle control for said carburetor, a cam member to operate the throttle control, electric clutch means to operatively connect said member to the transmission clutch control, said clutch means being actuated in accordance with the operation of the gear changing mechanism.

13. In a motor vehicle including clutch operating mechanism, a carburetor and a throttle control for the carburetor, means to operate the throttle control, selectively controlled means to determine the degree of operation of said means, said first named means being actuated by actuation of the clutch operating mechanism.

14. In a motor vehicle including a clutch control, a carburetor and a control for the carburetor, means to operate the throttle control, said means being arranged for operation upon actuation of the vehicle clutch control and electrically controlled means to operatively connect said first named means and the vehicle clutch control.

15. In a motor vehicle including a clutch control, a carburetor and a control for the carburetor, means to operate the throttle control, said means being arranged for operation upon actuation of the vehicle clutch control and an electrically controlled clutch element to operatively connected said first named means and the vehicle clutch control.

16. In a motor vehicle including a clutch mechanism and transmission gearing, means actuated by operation of the clutch mechanism and the shifting of the transmission gearing and dependent upon the position of the motor vehicle relative to the horizontal to control the throttling of the motor carburetor.

17. In a motor vehicle including a clutch mechanism and transmission gearing, means actuated by operation of the clutch mechanism and the operation of the transmission gearing to first and reverse positions and dependent upon the position of the motor vehicle relative to the horizontal to control the throttling of the motor carburetor.

18. In a motor vehicle including a clutch mechanism and transmission gearing, a carburetor, means to control throttling of said carburetor in operative connection therewith, said means varying within the limits predetermined by the position of the motor vehicle relative to the horizontal and positively set for operation at points within said limits by actuation of the transmission gearing of the motor vehicle, and said means being operatively connected to the clutch mechanism of the motor vehicle and actuated thereby.

19. The combination in a vehicle including a clutch mechanism and transmission gearing, of a control for the carburetor of the vehicle including means operatively connected to the carburetor and operated by the clutch to an initial position, said means being moved from its initial position and to control the carburetor by actuation of the transmission gearing, and gravity actuated means to determine the degree of the latter movement.

20. In a motor vehicle including gear changing mechanism, a clutch operator and carburetor, a throttle control for said carburetor, means to actuate said throttle control with the clutch operator, said means being normally released from the clutch operator, means to lock said means to the clutch operator in accordance with the angle of inclination of the vehicle and controlled by the actuation of the gear changing mechanism.

21. In a motor vehicle including gear changing mechanism, a transmission clutch control, a carburetor and a throttle control for said carburetor, a member to operate the throttle control, clutch means to operatively connect said member to the transmission clutch control, said clutch means being actuated in accordance with the angle of inclination of the vehicle and the operation of the gear changing mechanism.

22. The combination in a motor vehicle, of a carburetor, means normally disconnected from the carburetor to control the throttling thereof according to the inclination of the vehicle, and means to operatively connect said first named means to the carburetor throttle valve and to actuate said means.

MONTAGUE H. DUVAL.